US012768795B2

(12) United States Patent
Naggies et al.

(10) Patent No.: US 12,768,795 B2
(45) Date of Patent: Oct. 20, 2026

(54) PHOTOMETRIC PROCESS MEASUREMENT APPARATUS

(71) Applicant: HACH LANGE GMBH, Berlin (DE)

(72) Inventors: Andre Naggies, Berlin (DE); Axel Leyer, Berlin (DE); Oriol Gili De Villasante, Berlin (DE)

(73) Assignee: HACH LANGE GMBH, Berlin (DE)

( * ) Notice: Subject to any disclaimer, the term of this patent is extended or adjusted under 35 U.S.C. 154(b) by 183 days.

(21) Appl. No.: 18/845,661

(22) PCT Filed: Mar. 8, 2023

(86) PCT No.: PCT/EP2023/055879
§ 371 (c)(1),
(2) Date: Sep. 10, 2024

(87) PCT Pub. No.: WO2023/170141
PCT Pub. Date: Sep. 14, 2023

(65) Prior Publication Data

US 2025/0208052 A1 Jun. 26, 2025

(30) Foreign Application Priority Data

Mar. 10, 2022 (EP) .................................... 22161278

(51) Int. Cl.
*G01N 21/85* (2006.01)
*G01N 21/31* (2006.01)
(Continued)

(52) U.S. Cl.
CPC ....... *G01N 21/8507* (2013.01); *G01N 21/314* (2013.01); *G01N 21/33* (2013.01); *G01N 2201/0696* (2013.01); *H02M 3/33507* (2013.01)

(58) Field of Classification Search
CPC .......... H02M 3/33507; G01N 21/8507; G01N 21/314; G01N 21/33; G01N 33/1886; G01N 2021/3148; G01N 2021/069
See application file for complete search history.

(56) References Cited

U.S. PATENT DOCUMENTS 5,696,592 A 12/1997 Kuan
7,655,473 B2 * 2/2010 Golitz .................... G01N 21/33
422/68.1

(Continued)

FOREIGN PATENT DOCUMENTS

DE 102005007142 A1 8/2006

OTHER PUBLICATIONS

European Patent Office, International Search Report and Written Opinion, Jun. 7, 2023, 9 pages.

*Primary Examiner* — Sisay G Tiku
(74) *Attorney, Agent, or Firm* — Ference & Associates LLC

(57) ABSTRACT

The invention refers to a photometric process measurement arrangement (10) with a photometric immersion probe (20) being electrically supplied with a probe supply voltage (Us) and comprising: a photometer flashlight source (61), an impulse energy capacitor (33), an electronic flyback-converter (30) for successively electrically charging the impulse energy capacitor (33) with numerous charging voltage quantums (Uq), whereas the flyback-converter (30) is provided with a converter switch (31) between a converter supply voltage port (80) and a transformer (32), and a switching signal generator (49) for driving the converter switch (31) with a switching signal and comprising a standard duty cycle signal generator (44) for driving the converter switch (31) with a standard duty cycle value (D1) and comprising a boost duty cycle signal generator (45) for alternatively driving the converter switch (31) with a higher boost duty (Continued)

Figure 1:
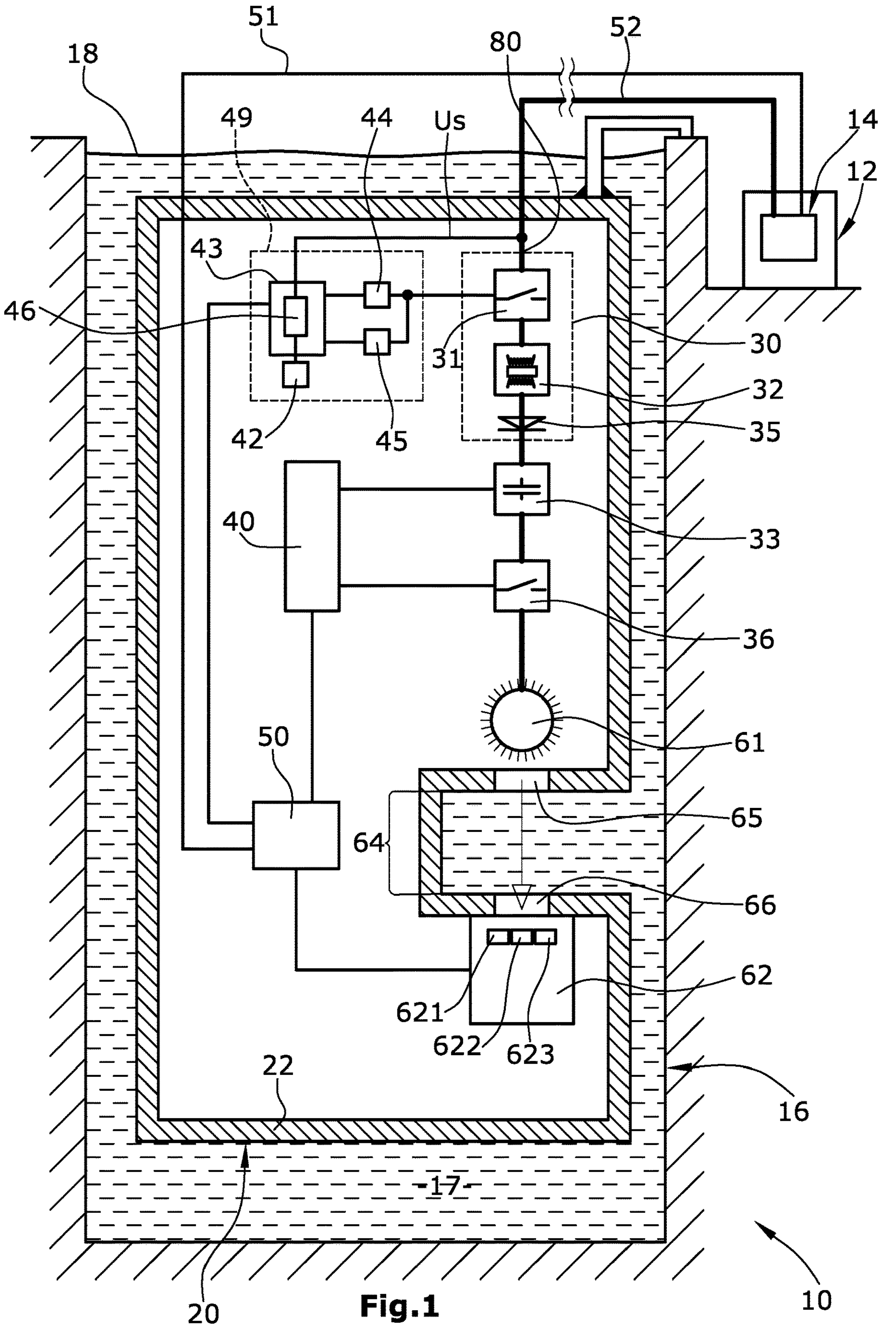

cycle value (D2), when the boost duty cycle signal generator (45) is activated. The switching signal generator (49) is provided with a supply voltage comparator (46) continuously comparing the probe supply voltage (Us) at the converter supply voltage port (80) and the memorized boost voltage value (Ub). The switching signal generator (49) activates the boost duty cycle signal generator (44) if the supply voltage comparator (46) determines that the supply voltage (Us) is below the boost voltage value (Ub).

8 Claims, 2 Drawing Sheets

(51) Int. Cl.

| | |
|---|---|
| ***G01N 21/33*** | (2006.01) |
| ***H02M 3/335*** | (2006.01) |

(56) References Cited

U.S. PATENT DOCUMENTS

| | | | | |
|---|---|---|---|---|
| 2005/0140340 | A1 | 6/2005 | Pai et al. | |
| 2011/0108720 | A1 * | 5/2011 | Ford .................... | G01N 21/274 250/262 |
| 2017/0238380 | A1 * | 8/2017 | Bannister ............. | H05B 45/395 315/224 |
| 2023/0077628 | A1 * | 3/2023 | Kompaniets ......... | G02B 26/007 250/226 |
| 2025/0314526 | A1 * | 10/2025 | Naggies .................... | G01J 3/36 |

* cited by examiner

PHOTOMETRIC PROCESS MEASUREMENT APPARATUS

The present application is a National Phase Entry of PCT International Application No. PCT/EP2023/055879, which was filed on Mar. 8, 2023, the contents of which are hereby incorporated by reference, which claims priority to EP Application Serial No. 22161278.1 filed Mar. 10, 2022, the contents of which are hereby incorporated by reference.

The invention refers to a photometric process measurement arrangement with a photometric immersion probe and to a method for controlling the switching signal generator for generating a switching signal for driving the converter switch of the electronic flyback-converter of the photometric process measurement arrangement.

A photometric process measurement arrangement comprises a land-based control unit and a separate photometric immersion probe being immersed into the water of a water basin. The water basin can be a part of a water treatment plant for controlling drinking water or for controlling a process step of a wastewater treatment process. A typical photometric immersion probe is disclosed in DE 10 2005 007 142 A1 and comprises a spectroscopic UV light source and a corresponding photometric detector detecting at least two wavelengths for photometrically determining, for example, the concentration of nitrate and nitrite.

The UV light source is preferably a high voltage UV xenon lamp which is ignited, for example, every 20 ms with a high temporary electric energy which is accumulated and stored in an impulse energy capacitor. A typical ignition voltage is 900 V. The immersion probe comprises a probe electronics comprising a flyback-converter for stepwisely increasing the voltage of the impulse energy capacitor with numerous charging voltage quantums having a quantum voltage of a few Volt until the ignition voltage of, for example, 900 V is reached.

The flyback-converter is provided with a converter switch between a converter supply voltage port having the actual probe supply voltage and a transformer. The converter switch is driven by a signal generator generating a switching signal having a constant a switching frequency and having a constant duty cycle. The transformer, the duty cycle length and the switching frequency are designed to guarantee that a maximum duration of a complete charging cycle for completely charging the impulse energy capacitor up to the ignition voltage is not exceeded. When designing the converter, it is assumed that the actual supply voltage will not fall to less than, for example, 85% of the nominal supply voltage of, for example, 12.0 V.

The immersion probe is supplied with the supply voltage of a land-based control unit having a typical nominal operating voltage level of, for example, 12.0 V. However, since the land-based control unit of the process measurement arrangement is arranged generally remote and occasionally with a relatively large distance of up to 100 m from the photometric immersion probe, the voltage loss between the land-based control unit and the photometric immersion probe can be considerable and can be fluctuating as well so that the actual probe supply voltage at the flyback-converter can fall, under adverse conditions, to less than 85% of the nominal supply voltage. Such a voltage drop at the flyback-converter is not generally a problem because the number of charging voltage quantums is automatically increased proportionally to arrive at the target ignition voltage, but the charging procedure is prolongated accordingly.

It is an object of the invention to provide a photometric process measurement arrangement and a method for controlling the photometric process measurement arrangement with a constant charging procedure.

This object is, according to the invention, solved with a photometric process measurement arrangement with the features of apparatus claim 1, and is solved with a method for controlling the photometric process measurement arrangement with the features of method claim 8.

The photometric process measurement arrangement according to the invention comprises a photometric immersion probe which is continuously and completely immersed into water. The immersion probe comprises a photometer flashlight source for providing photometric light impulses with a continuous optical spectrum, preferably with an optical spectrum focused on the ultraviolet spectrum for the determination of the concentration of, for example, nitrate and nitrite. Preferably, the flashlight source is a high voltage xenon lamp with a preferred ignition voltage of 500 to 1000 V.

The immersion probe comprises an impulse energy capacitor for storing the electric impulse energy. The immersion probe comprises an impulse ignition switch being electrically arranged electrically in-line and between the impulse energy capacitor and the photometer flashlight source. When the impulse ignition switch is closed, the electric energy stored in the impulse energy capacitor flows to the photometer flashlight source so that a photometric light impulse with a continuous frequency spectrum is generated. In practice, a period length of charging the impulse energy capacitor and initiating a photometric light impulse is in the range of 10 to 100 ms.

The immersion probe is provided with an electronic flyback-converter for successively electrically charging the impulse energy capacitor with numerous charging voltage quantums. The flyback-converter is provided with a converter switch between a converter supply voltage port having the actual probe supply voltage and a transformer. The immersion probe is provided with a switching signal generator for driving the converter switch with a switching signal having a preferably constant switching frequency of, for example, 1 kHz to 30 kHz. The switching signal generator comprises a standard duty cycle signal generator for driving the converter switch with a standard duty cycle value which can be, for example, 25 μs, which corresponds, for example with 50% of one period of a switching frequency signal of 20 kHz. The impulse energy capacitor is charged with a charging voltage quantum at every period of the switching signal and, typically, is in a range of 1 V to 20 V. The charging voltage quantum substantially depends on the duty cycle length and on the probe supply voltage.

The switching signal generator also comprises a boost duty cycle signal generator for alternatively driving the converter switch with a boost duty cycle value when the boost duty cycle signal generator is activated. The boost duty cycle value is higher/longer than the standard duty cycle value, and is, for example 10 to 30% higher/longer than the standard duty cycle value. Referring to a standard duty cycle value of 25 μs, the boost duty cycle value can typically be 28 to 30 μs.

The switching signal generator is provided with a supply voltage comparator and a boost voltage memory memorizing a boost voltage value. The supply voltage comparator continuously compares the actual probe supply voltage at the converter supply voltage part and the boost voltage value memorized in the boost voltage memory. The switching signal generator activates the boost duty cycle signal generator if the supply voltage comparator determines that the supply probe supply voltage is below the boost voltage value. As long as the probe supply voltage is equal or above the boost voltage value, the standard duty cycle signal generator is and remains active.

The boost voltage value a minimum voltage value which still guarantees that the impulse energy capacitor is completely charged in a maximum charging time interval so that the frequentness of the photometric measurements is not affected. Even if the probe supply voltage falls below the boost voltage value, a maximum charging time interval is not exceeded. However, the boost duty cycle value must not be used if the probe supply voltage is above the boost voltage value to avoid an overheating and damage of the transformer of the flyback-converter.

Preferably, the switching signal generator drives the converter switch always with a constant switching frequency in the standard and in the boost mode. The constant switching frequency is in the range of 1 kHz to 100 kHz. Preferably, the boost duty cycle value is 10% to 40% higher than the standard duty cycle value.

The immersion probe comprises an ignition voltage memory memorizing an ignition voltage value defining the impulse energy capacitor's voltage when the ignition switch is closed to cause the flashlight source to provide a photometric light impulse. A typical ignition voltage value is in the range of 900 V, and can be, for example, exactly 900.0 V.

Preferably, the photometric immersion probe comprises a voltage comparator comparing the actual electric capacitor's voltage with the memorized ignition voltage value. The voltage comparator preferably is an analogue electronic element which is fast and does not need any processor capacity. The ignition voltage memory is preferably defined by a constant analogue reference voltage source applied to the analog voltage comparator. If a general impulse command has been issued, the impulse ignition switch is closed and a photometric light impulse is caused as soon as the actual electric capacitor's voltage equals the memorized ignition voltage value.

Preferably, a land-based control unit for controlling the photometric immersion probe is provided. The land-based control unit provides a supply voltage for the photometric immersion probe of less than 100 V, preferably of less than 60 V, and typically of 12 V. The supply voltage provided by the land-based control unit can be identically with the general supply voltage of the electronics of the land-based control unit which is typically in the range of 5 to 20 V. Since the land-based control unit is arranged remote and often with a relatively large distance of up to 100 m from the photometric immersion probe, the supply voltage loss between the land-based control unit and the photometric immersion probe can be considerable so that the actual probe supply voltage at the converter supply voltage port can be considerably lower than the land-based control unit's supply voltage.

Preferably, the photometric immersion probe is provided with a photometric detector arrangement comprising at least two wavelength-selective detection elements. Since the photometric process measurement arrangement is designed to photometrically detect at least two different wavelengths, a flashlight source with a continuous spectrum is advantageous. However, this concept makes it necessary to reliably provide a perfect lifetime consistency of the photometric spectrum generated by the photometer flashlight source.

According to the independent method claim for controlling a photometer flashlight source of a photometric process measurement arrangement according to one of the apparatus claims, the following method steps are provided:

the supply voltage comparator continuously compares the actual probe supply voltage and the boost voltage value, the switching signal generator activates the standard duty cycle signal generator if the voltage comparator determines that the actual supply voltage is not below the boost voltage value, or alternatively the switching signal generator activates the boost duty cycle signal generator if the supply voltage comparator determines that the actual supply voltage (Us) is below the boost voltage value.

Figure 2:
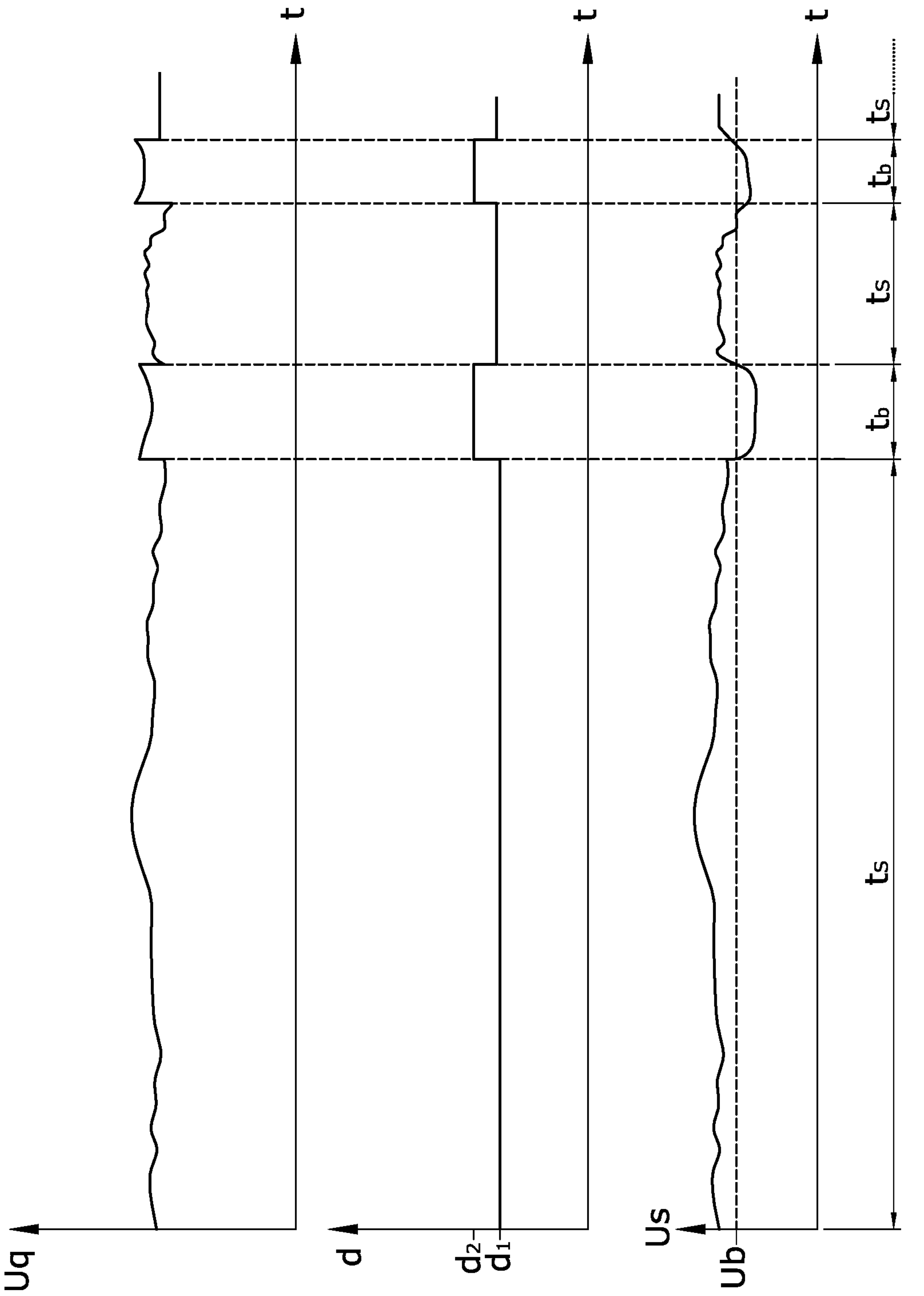

An embodiment of the invention is explained with reference to the enclosed drawings, wherein FIG. 1 schematically shows a photometric process measurement arrangement with a photometric immersion probe comprising an arrangement for energizing an impulse energy capacitor, a flyback-converter and a switching signal generator for controlling the process of charging the impulse energy capacitor, and FIG. 2 shows a time-related diagram of the actual probe supply voltage, the duty cycle level and the resulting charging voltage quantum energy level of the signal switching signal generator of FIG. 1.

FIG. 1 schematically shows a photometric process measurement arrangement 10 substantially consisting of a land-based control unit 12 and a photometric immersion probe 20 being arranged remote from the land-based control unit 12. The immersion probe 20 is arranged below a water surface 18 and is completely immersed into water 17 of a water basin 16. The water basin 16 can be a part of a wastewater treatment plant. The photometric process measurement arrangement 10 determines the concentration of nitrite and nitrate in the water 17.

The photometric immersion probe 20 comprises, within a fluidtight probe housing 22, a photometer flashlight source 61 and a photometric detector arrangement 62 with three different photometric detector elements 621, 622, 623 with three different detection wavelengths. The photometer flashlight source 61 and the photometric detector arrangement 62 together define a photometer device for detecting the light absorption of a water sample in a photometric measuring section 64 defined between a light inlet window 65 and a light outlet window 66.

Alternatively, the probe 20 could be used in a laboratory by means of a suitable adapter fluidically closing the photometric measuring section 64 which is fed with the water by a suitable water feeding arrangement.

The photometric immersion probe 20 also comprises an electronic flyback-converter 30 for generating charging voltage quantums Uq, comprises an impulse energy capacitor 33 having an actual electric capacitor's voltage U and accumulating the charging voltage quantums Uq, comprises an impulse ignition switch 36, comprises an electronic ignition control unit 40 for controlling the ignition switch 36, and comprises an electronic probe control 50 for controlling a switching signal generator 49, the photometric detector 62, the ignition control unit 40 and the communication with a control electronics 14 of the land-based control unit 12 via a signal line 51.

The flyback-converter 30 of the immersion probe 20 is supplied with electric energy having a nominal supply voltage Un of 12 V at the land-based control unit 12 via an electric supply line 52. Due to a considerable length of the electric supply line 52, the effective actual probe supply voltage Up at a converter supply voltage port 80 can be substantially reduced and temporarily or constantly can be less than 11 V, or even can be less than 10 V. The flyback-converter 30 comprises a converter switch 31, a transformer 32 and a blocking diode 35. The converter switch 31 is a MOSFET and is opened and closed with a constant switching frequency of, for example, 20 kHz. A totally empty impulse energy capacitor 33 is loaded with about 200 charging voltage quantums Uq of a few Volts each, which results in a total charging duration of about 10 ms until the capacitor's voltage U arrives at the ignition voltage value Ui.

The switching signal generator 49 comprises a duty cycle control 43 with a supply voltage comparator 46, comprises a boost voltage memory 42 memorizing a boost voltage value Ub, comprises a standard duty cycle signal generator 44 memorizing and generating a standard duty cycle value d1 and comprises a boost duty cycle signal generator 45 memorizing and generating an elongated boost duty cycle value d2.

During a charging process for electrically charging the impulse energy capacitor 33, the supply voltage comparator 46 continuously controls if the probe supply voltage Us at the converter supply voltage port 80 falls or is below the boost voltage value Ub memorized in the boost voltage memory 42. As long as the actual probe supply voltage Us is not below the boost voltage value Ub, the duty cycle control 43 continuously activates the standard duty cycle signal generator 44 which generates a squarewave-signal having a switching frequency f of 20 KHz and a duty cycle length of 25 μs. The switching frequency is the number of full periods per second. If the actual probe supply voltage Us is below the boost voltage value Ub of 10.5 V, the duty cycle control 43 activates the boost duty cycle signal generator 44 which generates a signal having the same unchanged switching frequency f of 20 kHz but having an elongated duty cycle length of 29 μs. As soon as the energy of each charging voltage quantum generated by the flyback-converter 30 substantially decreases due to a drop of the actual probe supply voltage Us, this energy drop is compensated by increasing the duty cycle of the switching signal generated by the switching signal generator 49, as shown in FIG. 2.

The supply voltage comparator 46 comprises a hysteresis element defining a hysteresis difference of 0.5 V to avoid unwanted unsteadiness in the selection and activation of the duty cycles.

FIG. 2 shows the time-related correlations between the actual probe supply voltage Us, the corresponding duty cycle d and the resulting voltage of a charging quantum Uq. As long as the actual probe supply voltage Us is above the boost voltage value Ub, the duty cycle d is the standard duty cycle d1, as during the standard periods ts. As soon as and as long as the actual probe supply voltage Us is below the boost voltage value Ub, the duty cycle d is the boost duty cycle d2, as during the boost periods tb. The resulting voltage Uq of a charging quantum is substantially increased during the boost cycle periods tb.

The ignition of the flashlight source 61 is controlled by the ignition control 40. The ignition control 40 comprises a voltage comparator for comparing the actual electric capacitor's voltage U with a memorized ignition voltage value Ui, comprises an ignition voltage memory memorizing the ignition voltage value Ui, and comprises an ignition trigger controlling the ignition switch 36. The control of the immersion probe 20 and the communication with the land-based control unit is provided by the electronic probe control 50.

The ignition voltage operator continuously compares the actual electric capacitor's voltage U with the memorized ignition voltage value Ui. As soon as the actual electric capacitor's voltage U equals the memorized ignition voltage value Ui of exactly 900.0 V, the ignition trigger closes the ignition switch 36 so that the flashlight source 61 generates a photometric light impulse with a continuous frequency spectrum. The wavelength-selective light intensity values received by the photometric detector 62 are signalized by the probe control 50 to the land-based control unit 12, and a new charging sequence is started.

The invention claimed is:

1. A photometric process measurement arrangement with a photometric immersion probe, the photometric immersion probe being electrically supplied with a probe supply voltage comprising:

a photometer flashlight source for providing photometric light impulses with a continuous spectrum;

an impulse energy capacitor for storing an electric impulse energy;

an electronic flyback-converter for successively electrically charging the impulse energy capacitor with numerous charging voltage quantums, whereas the flyback-converter is provided with a converter switch between a converter supply voltage port and a transformer;

a switching signal generator for driving the converter switch with a switching signal having a switching frequency, the switching signal generator comprising a standard duty cycle signal generator for driving the converter switch with a standard duty cycle value and comprising a boost duty cycle signal generator for alternatively driving the converter switch with a higher boost duty cycle value, when the boost duty cycle signal generator is activated;

the switching signal generator being provided with a supply voltage comparator and a boost voltage memory memorizing a boost voltage value, the supply voltage comparator continuously comparing the probe supply voltage at the converter supply voltage port and the boost voltage value;

the switching signal generator activating the boost duty cycle signal generator if the supply voltage comparator determines that the supply voltage is below the boost voltage value.

2. The photometric process measurement arrangement of claim 1, wherein the switching signal generator drives the converter switch with a constant switching frequency, the constant switching frequency being in a range of 1 to 100 kHz.

3. The photometric process measurement arrangement of claim 1, wherein the boost duty cycle value is 10% to 40% higher than the standard duty cycle value.

4. The photometric process measurement arrangement of claim 1, wherein an impulse ignition switch is electrically arranged between the impulse energy capacitor and the photometer flashlight source.

5. The photometric process measurement arrangement of claim 1, wherein a land-based control unit for controlling the photometric immersion probe is provided, whereas the land-based control unit provides the probe supply voltage for the photometric immersion probe of less than 100 V, preferably of less than 60 V.

6. The photometric process measurement arrangement of claim 1, wherein the photometer flashlight source is a high voltage xenon lamp.

7. The photometric process measurement arrangement of claim 1, wherein the photometric immersion probe is provided with a photometric detector arrangement comprising at least two wavelength-selective detection elements.

8. A method for controlling a switching signal generator generating a switching signal for driving a converter switch of an electronic flyback-converter of a photometric process measurement arrangement comprising:

continuously comparing, using a supply voltage comparator, an actual probe supply voltage and a boost voltage value;

activating, using the switching signal generator, a standard duty cycle signal generator if the supply voltage comparator determines that the actual supply voltage is not below the boost voltage value; and activating, using the switching signal generator, a boost duty cycle signal generator if the supply voltage comparator determines that the actual supply voltage is below the boost voltage value.

* * * * *